Nov. 24, 1953
F. W. SCHMIDT ET AL
2,660,368
HINGE MOUNTING FOR ANGULAR ADJUSTMENT
Filed Oct. 5, 1950
2 Sheets-Sheet 1
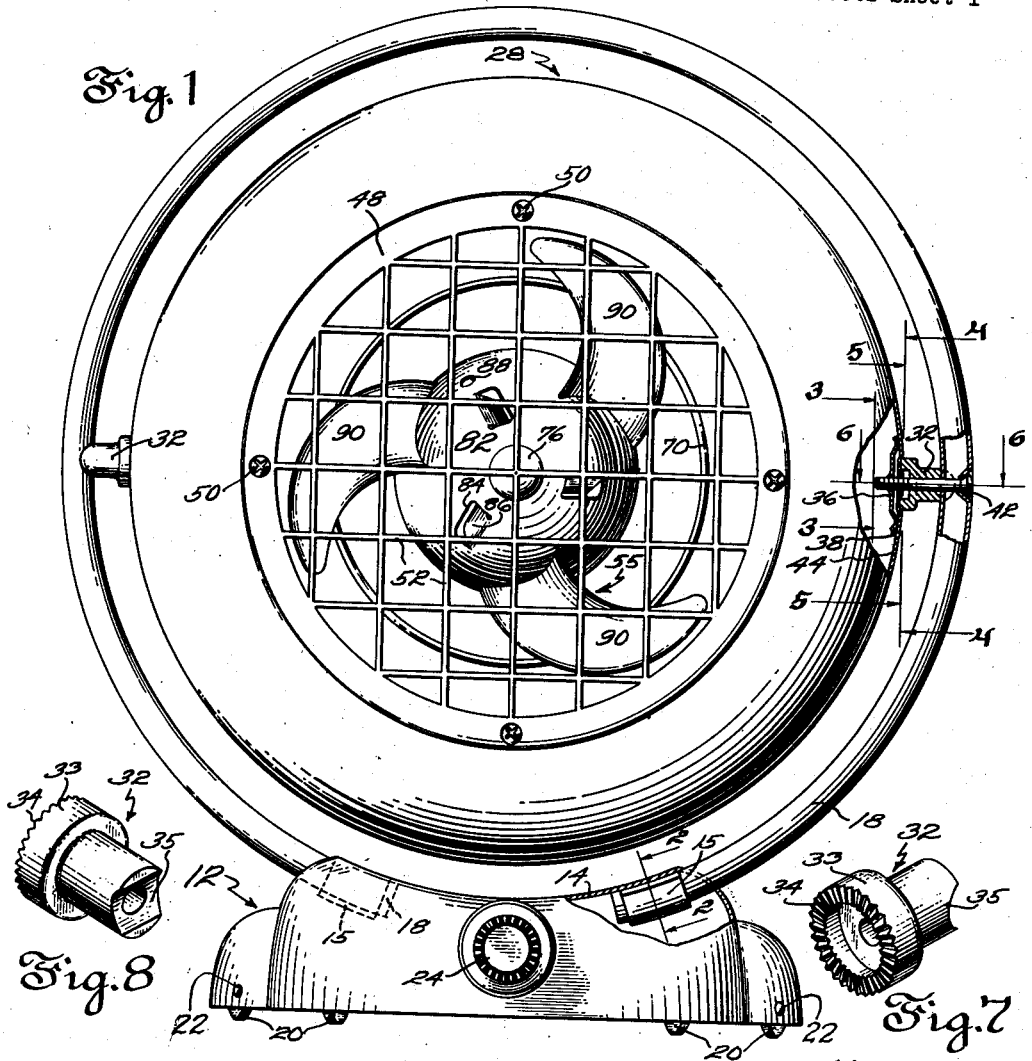
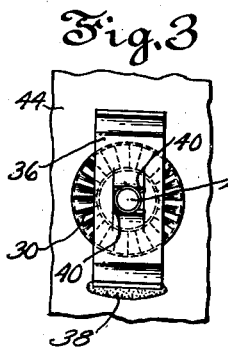
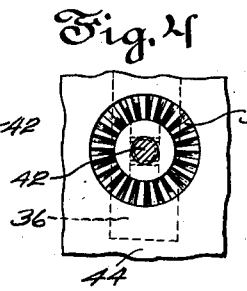
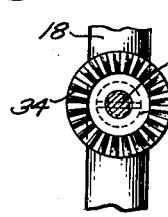
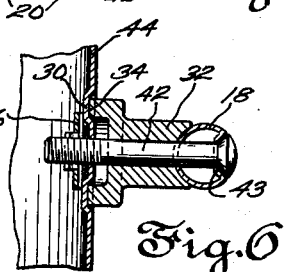
INVENTORS
Frederick W. Schmidt
William F. Moore
Arthur R. Edberg
BY
ATTORNEY Patented Nov. 24, 1953

2,660,368

UNITED STATES PATENT OFFICE 2,660,368

HINGE MOUNTING FOR ANGULAR ADJUSTMENT

Frederick W. Schmidt, Branford, and William Francis Moore and Arthur R. Edberg, New Haven, Conn., assignors to The A. C. Gilbert Company, New Haven, Conn., a corporation of Maryland Application October 5, 1950, Serial No. 188,524

7 Claims. (Cl. 230—273)

1

This invention relates to pivotal supporting structure useful for instance in an air blowing unit such as a household electric fan enabling such unit to be swung to and maintained in selective positions for aiming a projected stream of air in desired directions.

One object of the invention is to provide rugged and durable hinge construction adapted to support the air blowing unit of the fan in swingable relation to a bifurcate means of support therefor and particularly where the swingably coupled structures are of hollow nature and formed from sheet metal for the sake of strength and economy in production.

A particular object is to equip a hollow, torus-shaped means of support with a hinge post in spur-like relation thereto one end of which post conforms to the outer surface contour of the torus thereby to keep it from swiveling when the air blowing unit is swung relatively to the hinge post from one to another angular position and to coaxially align two widely separated such hinge posts.

A further object is to utilize as position maintaining detents a circular series of ridges and grooves stamped in sheet metal to maintain the air blowing unit at various angles to which it may be swung.

A related object is to make a simple sheet metal part serve as combined thrust-spring and nut by holding to the threads of a hinge bolt.

These and other objects of the invention will appear in greater particular from the following description of a successful embodiment of the invention which has reference to the accompanying drawings wherein:

Fig. 1 is a front elevation of an electric household fan embodying the present improvements drawn on a smaller scale than its preferred actual size, showing certain parts broken away to expose details of construction.

Fig. 2 is a fragmentary view taken in section on the plane 2—2 in Fig. 1 looking in the direction of the arrows.

Figure 9:
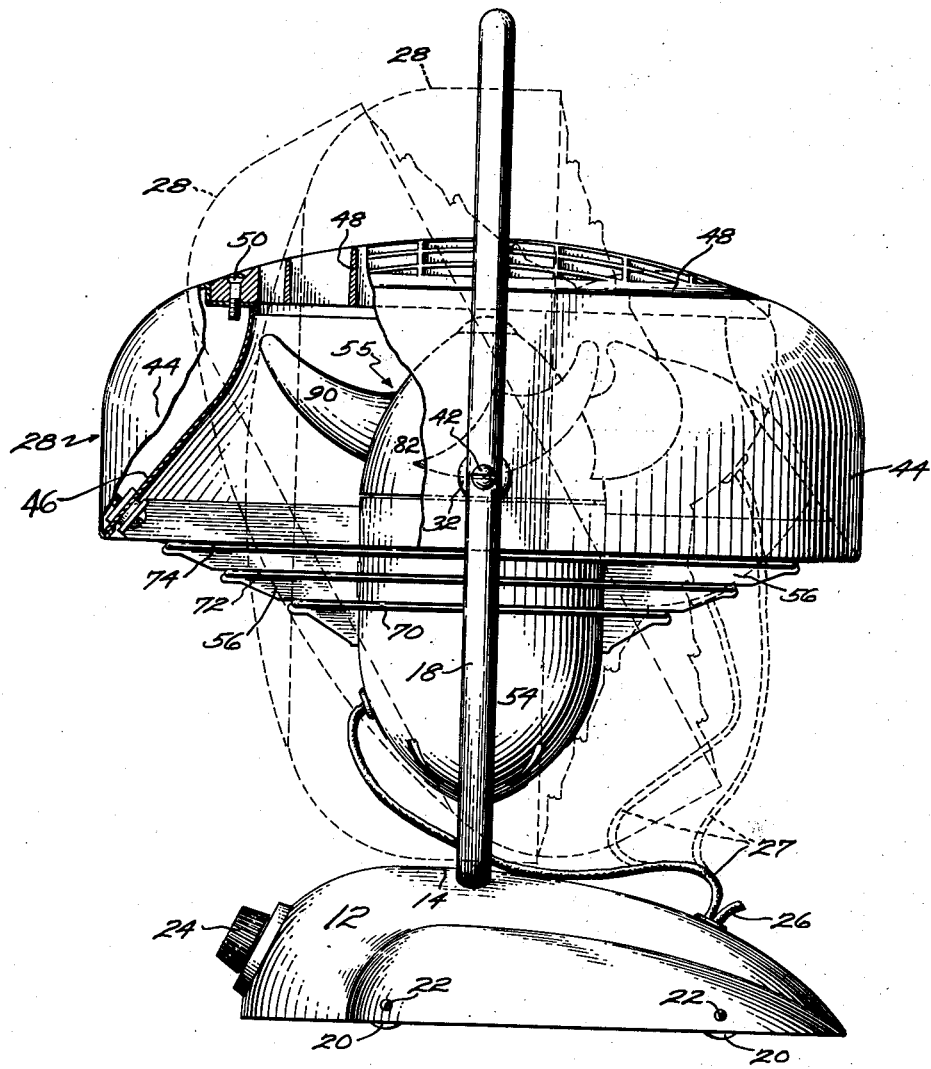

Figs. 3, 4 and 5 are fragmentary views taken in section on the planes 3—3, 4—4, and 5—5, respectively, in Fig. 1 looking in the directions of the arrows.

Fig. 6 is a fragmentary view drawn on an enlarged scale taken on the plane 6—6 in Fig. 1 looking in the direction of the arrows.

2

Figs. 7 and 8 are perspective views of the pivot post detached looking at respectively opposite ends thereof.

Fig. 9 shows the fan of Fig. 1 in elevation and indicates by broken lines various adjusted positions to which the air blowing unit may selectively be swung.

The exceptional handiness and attractive appearance of a fan incorporating the present improvements results in part from features characterizing its standard, the same including a hollow base 12 having a dished top wall 14 against the under surface of which is fixedly clamped by clips 15 the bottom ends of a discontinuous rigid circular frame ring 16. This frame ring for strength and lightness may be hollow and formed from metal tubing. The bottom edges of base 12 are held elevated above the supporting surface for the fan by conventional foot discs 20 of non-scarring material such as medium hard rubber fastened to the base by rivets 22. Inside the hollow of the base there is mounted a control switch (not shown) governing current supplied to the motor 54 through the flexible wire cable 27 and derived from attachment cord 26. The control switch is operated by a turnable handle knob 24 accessible at the front of the base.

The fan motor 54, impeller 55 and funnel shell structure 28 comprise an assembled unit which may be termed the air streaming unit. It includes fan blades 90 carried by the impeller hub 82 which latter is provided with apertures 84 and 88, as well as auxiliary inwardly directed air impelling blades 86 which induce internal circulation through apertures 84 to cool the motor.

Motor 54 is held in rigid relation to the encompassing funnel shell structure 28 by a circular series of fin plates 56 which extend radially and span the annular gap between the motor and the funnel shell structure. The strength of these plates is reinforced by wire hoops 70, 72, and 74 which also guard against accidental intrusion of foreign articles through the said annular space into the vicinity of the fan blades. Each of fin plates 56 is of generally triangular shape and has a radially innermost base edge firmly fixed to the motor body in any suitable way and has its outermost end or apex fixed to the funnel shell by means of structure particularly disclosed and claimed in a copending application.

Funnel shell structure 28 comprises a hollow annulus of considerably larger diameter than the motor composed of the edge-to-edge assemblage of an inner or conduit shell 46 and an outer or casing shell 44. The former provides a short tapering duct that leads intaken air to the fan blades 90. This air then becomes projected in a stream from the air impeller 82 outward (or upward in Fig. 9) through the grid 48 that is removably made fast to the casing shell 44 of funnel structure 28.

Figs. 1 and 3 to 6, inclusive, show the outer wall of casing shell 44 serving as means by which the sides of the air streaming unit as a whole are pivotally mounted and yieldably stayed on the frame ring 18 in various angular positions such as those shown by full and broken lines in Fig. 9 to which it may be adjusted by swinging it about a horizontal axis. The unit supporting extents of ring 18 comprise branch arms of a bifurcate support while the top half of the ring may serve as a handle for conveniently lifting the entire fan in carrying it from place to place. This outer peripheral wall of casing shell 44 is flattened in a small annular area where it is embossed by die stamping to produce a circular series of radially directed crimps 30 best shown in Figs. 3 and 4. The adjacent annular surface of the end of a horizontally disposed hinge post 32 is matingly ridged and notched in radial directions as shown at 34 in Figs. 5, and 7. Hinge post 32 is confined within the space between each support arm 18 and the swingable unit 28.

An elongated bowed spring-leaf retainer 36 has at least one of its ends welded to the inner surface of the wall of casing shell 44 as at 38 (Fig. 3) and is apertured to provide two sharp upset lips 40 spaced just far enough apart to engage the threads of a hinge pin 42 and coact therewith as a nut. Hinge pin 42 is in the nature of a removable screw which penetrates the frame ring 18, and also hinge post 32, and the wall of casing shell 44. The head of screw 42 is sunk flush in a countersink 43 stamped inward of the outer tubular wall of the frame ringe 18. Thus the inner end of each screw 42 projects beyond the inner end of hinge post 32 into holding engagement with the side of the air streaming unit, the head of the screw and the retainer 36 engaging respectively the frame ring 18 and the fan housing 44 in a manner to prevent separation thereof from the ends of the hinge post 32.

Hinge post 32 has the shape shown in Figs. 1, 6, 7 and 8 wherein the inner end 33 is enlarged, hollow and castellated on its annular end face carrying the radially directed notches and ridges 34. The opposite and smaller end of hinge post 32 is diametrically channeled at 35 to conform to the inward facing external surface of tubular frame ring 18 whereby fitting and rotation preventing abutment of this smaller end of the hinge post against the frame ring, as shown in Fig. 6, always prevents hinge post 32 from swiveling about its own axis relatively to the frame ring and helps to establish coaxial alignment of the widely separated posts 32. Post 32 and frame ring 18 are constantly pulled together yieldably by the resilience in retainer 36 transmitted through hinge pin or pivot screw 42 when the unit 28 and frame ring 18 are assembled together.

When hinge screws 42 are entirely removed, the air streaming unit 28, 54, 55 can be removed as a whole from the frame ring 18 and restored thereto or replaced by another at will. When either hinge screw 42 is tightened by screwing it further into engagement with the retainer 36, increasing degrees of resistance to the turning of casing shell 28 relatively to hinge stud 32 are set up. However there is sufficient flexural yielding of the resilient retainer 36 axially of hinge screw 42 to permit the crimps 30 to slip in stages rotatively past the ridges and notches or grooves 34. Normally however they will automatically seat in lodged together relation and thus retain the air streaming unit at any angle of inclination to which it may be adjusted.

Features of the air streaming unit and its grid illustrated in Figs. 1 and 9 are claimed in a copending application, Serial No. 195,210 filed November 13, 1950. Features of the motor mounting structure illustrated in Fig. 9 are claimed in copending application, Serial No. 188,523 filed October 5, 1950.

The following claims are directed to and intended to cover all fair equivalents for the shapes and relationships of parts disclosed herein that come within the broadest interpretation of the language of the claims.

We claim:

1. Pivot construction for automatically maintaining a supported swingable unit in chosen angular positions, comprising in combination with the swingable unit, a bifurcate support having branch arms flanked respectively opposite sides of said unit for supporting the same, coaxial hollow hinge posts confined respectively within spaces between said arms and said unit, each hinge post having one end abutting and fitting against said unit in a manner to permit relative rotary movement therebetween and having its other end fast to the arm in a manner to prevent relative rotary movement between said post and arm, a hinge pin extending freely through each of said arms and through the hinge post fast thereto, said pin having one end projecting beyond the end of said post remote from the arm into holding engagement with the adjacent side of said unit, and retaining means on the other end of each of said hinge pins engaging said arm in a manner to oppose separation of said unit from the first said end of the hinge post.

2. Pivot construction as defined in claim 1 in which the said swingable unit has a thin side wall penetrated by the said hinge pin, together with an arcuate series of crimps in said wall disposed about said hinge pin, and cooperative detent means on one end of the said hinge post.

3. Pivot construction as defined in claim 1, together with interengaging sets of ridges and grooves, said sets being located in arcuate series respectively on one end of the said hinge post and on said swingable unit, and a leaf spring cooperative with the said retaining means bearing against the said swingable unit and exerting tension on the said hinge pin in such axial direction as to urge said sets of ridges and grooves yieldingly into mutual detentive engagement.

4. Pivot construction as defined in claim 3, in which the said hinge posts abut interlockingly against the said supporting arms in a manner to prevent turning of said post about the said axis.

5. Pivot construction as defined in claim 4, in which at least one of the said hinge posts has one of its ends shaped to conform to the external contour of its said supporting arm.

6. Pivot construction as defined in claim 3 in which at least one of the said supporting arms is tubular, and the abutting said hinge post contains a channel extending across one end thereof conforming in shape to and firmly saddled against said tubular support arm.

7. Pivot construction as defined in claim 6, in which the said supporting arm has a tubular wall indented to form a countersunk depression, and the said hinge pin has a head lodged in said depression substantially flush with the outer contour of the said tubular wall.

FREDERICK W. SCHMIDT.
  WILLIAM FRANCIS MOORE.
  ARTHUR R. EDBERG.

References Cited in the file of this patent

UNITED STATES PATENTS

| Number | Name | Date |
|---|---|---|
| 1,231,635 | Nelson | July 3, 1917 |
| 1,421,467 | Harden | July 4, 1922 |
| 2,363,907 | Spear | Nov. 28, 1944 |
| 2,544,281 | Seil | Mar. 6, 1951 |
| 2,554,600 | Sutton | May 29, 1951 |
| 2,606,273 | Franklin | Aug. 5, 1952 |